Nov. 11, 1952     W. A. SMITH     2,617,657
SELF-LOCKING CHUCK

Filed Dec. 15, 1950     2 SHEETS—SHEET 1

Inventor
William A. Smith
by Parker & Carter
Attorneys

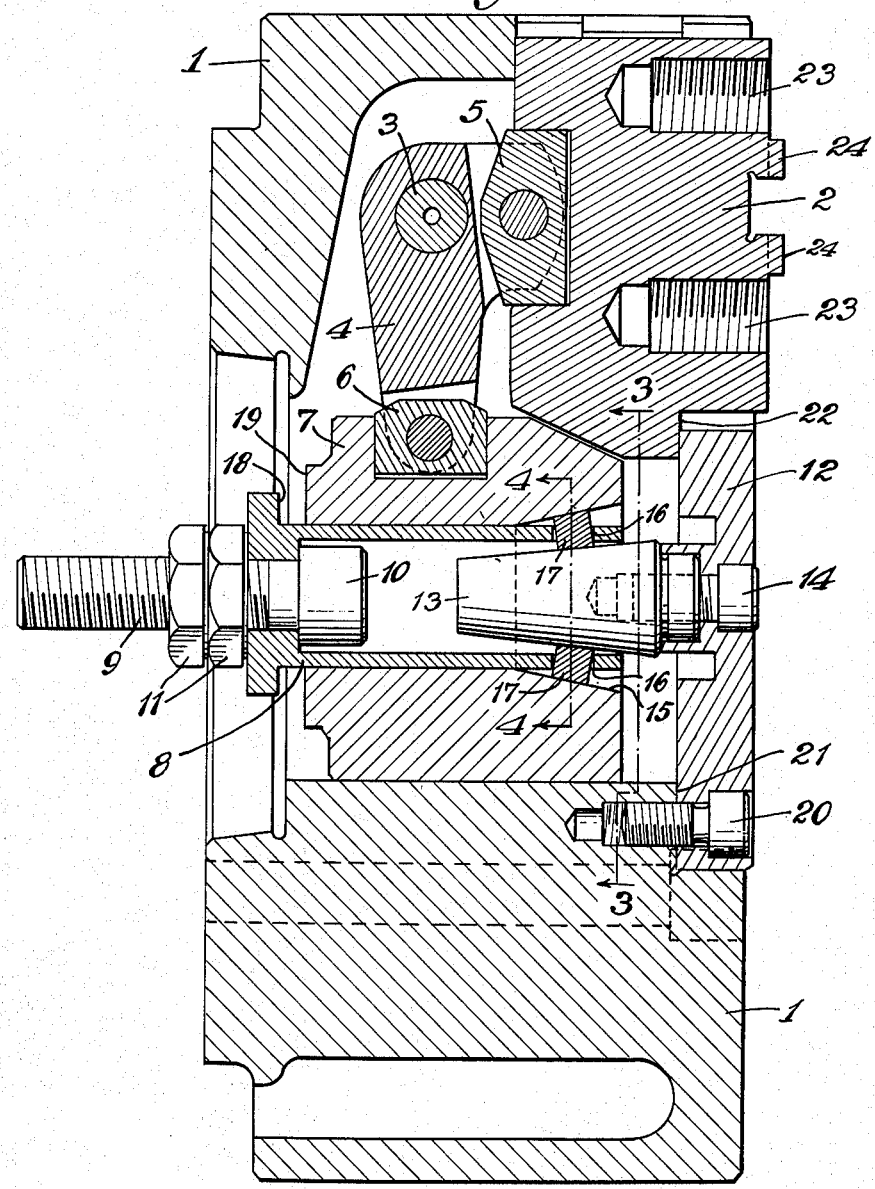

Patented Nov. 11, 1952

2,617,657

UNITED STATES PATENT OFFICE 2,617,657

SELF-LOCKING CHUCK

William A. Smith, Logansport, Ind., assignor to Logansport Machine Co., Inc., a corporation of Indiana Application December 15, 1950, Serial No. 200,974

11 Claims. (Cl. 279—119)

My invention relates to improvements in self-locking chucks and has for one object to provide a chuck mechanism which may be opened and closed by the usual operating mechanism but which remains locked in closed position until it is positively opened by the operating mechanism.

I have illustrated my invention as applied to a conventional lathe chuck design. The invention is illustrated more or less diagrammatically in the accompanying drawings, wherein:

Figure 2 is a section along the line 2—2 of Figure 1;

Like parts are indicated by like characters throughout the specification and drawings.

Figure 1:
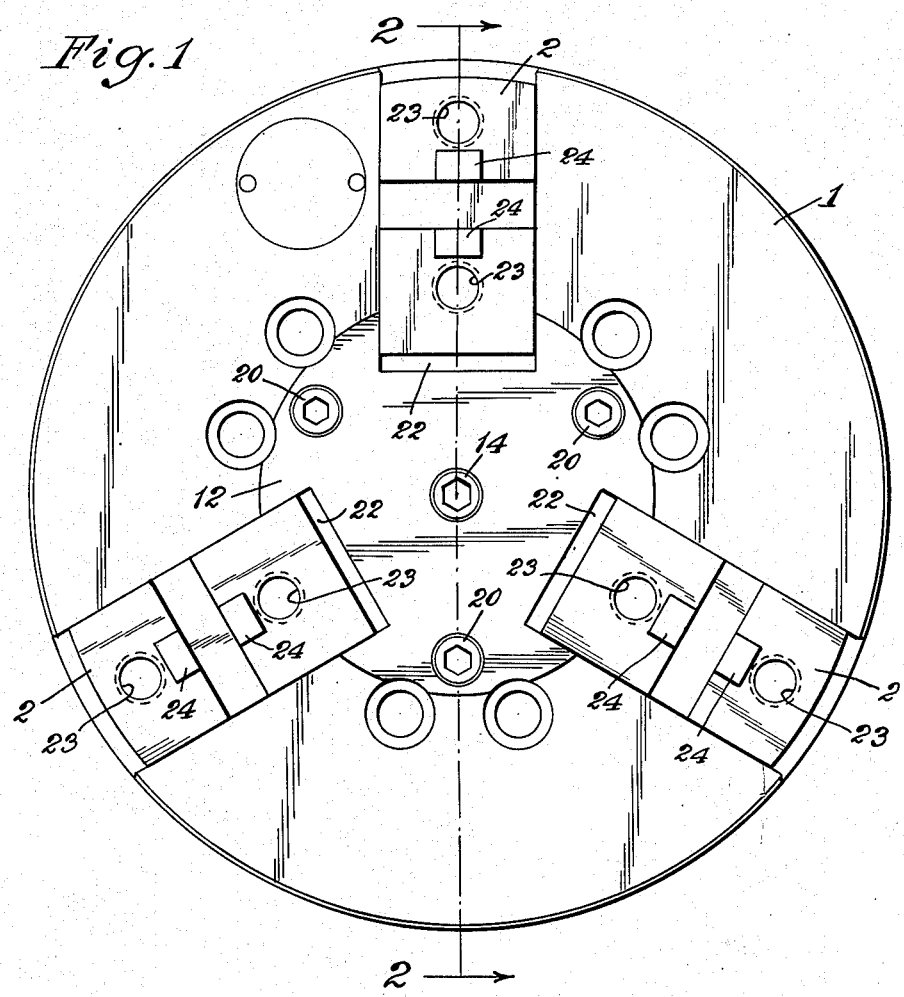
Figure 1 is a front elevation of a chuck embodying my invention.
Figure 3:
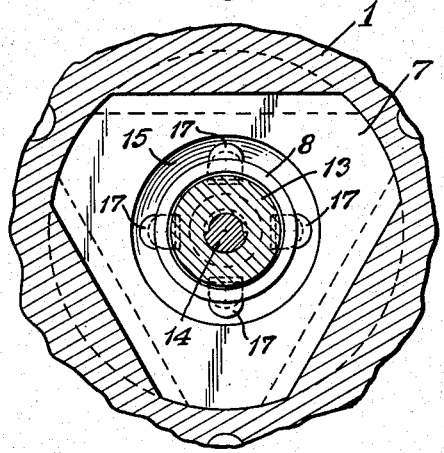
Figure 3 is a section along the line 3—3 of Figure 2 looking in the direction of the arrows.
Figure 4:
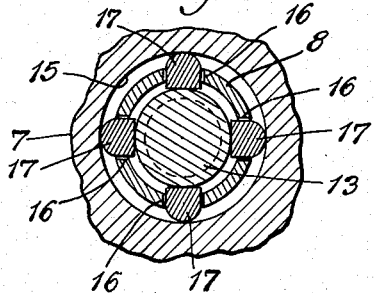
Figure 4 is a section along the line 4—4 of Figure 2 looking in the direction of the arrows.

1 is the chuck body. It is adapted to be mounted on a spindle or a face plate in any suitable manner, the details of the mounting of the chuck forming no part of my invention are not here illustrated. The chuck body is radially slotted and in each slot is a chuck jaw 2 mounted for radial movement toward and from the center of the chuck. Pivot pins 3 in the chuck body carry bell crank levers 4, each pivotally associated with a driving member 5 socketed within the chuck body for axial movement therein so that movement of the levers about their pivot pins 3 will cause the chuck jaws to move radially toward and from the center of the chuck body. The inner end of each lever 4 is pivoted on a block 6 axially movable in the draw sleeve 7 so that longitudinal movement of the draw sleeve will cause angular movement of the levers 4 to open or close the jaws.

The draw sleeve 7 is centrally apertured to provide a bearing for draw tube 8. The draw tube 8 is centrally apertured and is rotatable on the draw stud 9. The head 10 on the threaded stud 9 with the nuts 11 hold the stud 9 and tube 8 together for longitudinal movement. The stud is threaded also for connection to any suitable chuck operating mechanism not here shown since it forms no part of my present invention.

At the front of the chuck body is a lock plug retaining plate 12 which carries a lock plug 13 held in place by a plug retaining screw 14. The forward end of the draw sleeve 7 is counterbored at 15 with an internal taper twice that of the external taper on the lock plug 13. In other words, the external taper is half the inclination to its longitudinal axis as that of the internal taper. The draw tube 8 is apertured at 16 to contain a plurality of draw blocks 17 as shown in Figure 1. The draw blocks 17 bear upon the counterbore surface 15 and the tapered outer face of the lock plug 13.

When tension is exerted on the draw stud 9, it causes the draw tube 8 to move to the left, the draw blocks 17 moving with the draw tube cause the draw sleeve 7 also to move to the left, rotating the levers 4 to draw the chuck jaws 2 inwardly to grip the work.

Because the taper of the lock plug 13 is less than that of the counterbore 15, the draw blocks 17 remain locked in the position to which they are moved whether tension continues to be applied to the draw stud 9 or not. Thus the chuck grips the work when the movement of the draw stud is completed even though tension is no longer applied to the draw stud. Thus centrifugal force or failure of power will not cause a release of the work.

When the work is to be released, the draw stud 9 is moved to the right moving the draw tube 8 and the draw blocks with it. This releases the wedging locking action of the draw blocks between the two tapered surfaces and when the plane surface 18 on the flanged end of the draw tube 8 engages the plane surface 19 on the draw sleeves 7 the now unlocked draw sleeve will move to the right imparting annular motion to the bell crank levers 4 moving the chuck jaws outwardly to release the work.

The locking mechanism therefore includes the lock plug with its exterior tapered surface, the draw sleeve with its interior tapered surface and the draw blocks adapted to be gripped between those two surfaces. Since the two tapers are different, there is no tendency for the draw blocks to move to the right unless and until they are positively moved to the right toward the releasing position by movement imparted to the draw tube.

The lock plug retaining plate is held in position by screws 20 which hold it against the shoulder 21 in the chuck body 1. The plate also overhangs the shoulders 22 on the jaws so as to constrain them to radial movement and prevent axial movement thereof. The threaded apertures 23 are merely the usual threaded apertures provided in chuck jaws for attachment of work and the same is true of the jaw teeth 24. They form no part of my invention but are shown merely to illustrate the general type of chuck on which my invention may be applied.

It will be realized that whereas I have shown and described an operative device, still many changes might be made in the shape, size, number and arrangement of parts without departing materially from the spirit of my invention. I wish, therefore, that my showing be taken as in a sense diagrammatic rather than limiting me to the precise showing.

There is a definite relation between the tapers in question and the amount of draw sleeve travel that is necessary to give a full opening and closing of the chuck jaws. These tapers are therefore calculated to produce a constant bearing with the locking pins for the entire movement of the draw sleeve and at the same time permit the taper plug to be of sufficient length to retain the pins when they are at the small end of this plug.

Another principle involved in these tapers is a slight rocking or tilting movement of the locking pins between these tapers when the chuck is in a gripping position. At this time these pins are in parallel contact with the draw sleeve taper and the plug taper, but as the chuck is revolved on the machine spindle, centrifugal force is built up from the master chuck jaws and transmitted through the chuck levers to the draw sleeve which tends to force the draw sleeve toward the taper plug retaining plate. When this occurs these locking pins tend to tilt or rock an amount permissible by the clearance tolerance between these locking pins and the tapers and exert a maximum locking force at the plug leading edge and the draw sleeve trailing edge of the locking pins.

I claim:

1. A self-locking chuck including in a housing a plurality of radially movable chuck jaws, an axially movable draw sleeve, bell crank levers interposed between the sleeve and the jaws pivoted in the housing whereby longitudinal movement of the sleeve causes radial movement of the jaws, a draw tube slidable in the draw sleeve, a draw stud associated with the draw tube adapted to displace it longitudinally, a lock plug fixed in the housing penetrating the draw tube, the draw sleeve having an internal taper, the lock plug having an opposed external taper in the same direction as and approximately half that of the internal taper, the draw tube being apertured, draw blocks contained within the apertures and adapted to engage the taper in the draw sleeve and the taper on the lock plug.

2. In a self-locking chuck, an axially movable draw sleeve, a fixed lock plug concentric therewith, the draw sleeve having an internal tapered surface, the plug having an external tapered surface, the tapered surface of the plug extending in the same direction as and being more sharply inclined to the axis than is the internal taper in the sleeve, draw blocks interposed between the two tapered surfaces and means for displacing said blocks axially to impart axial movement to the draw sleeve to close the chuck.

3. In a self-locking chuck, an axially movable draw sleeve, a fixed lock plug concentric therewith, the draw sleeve having an internal tapered surface, the plug having an external tapered surface, the tapered surface of the plug extending in the same direction as and being more sharply inclined to the axis than is the internal taper in the sleeve, draw blocks interposed between the two tapered surfaces and means for displacing said blocks axially to impart axial movement to the draw sleeve to close the chuck and means independent of the draw blocks to positively move the draw sleeve in the opposite direction.

4. In a self-locking chuck, a longitudinally movable centrally apertured draw sleeve, a draw tube seated within and longitudinally movable with respect to the draw sleeve, a fixed exteriorly tapered lock plug penetrating the draw tube, the draw tube being apertured, a plurality of draw blocks one within each aperture of the draw tube, the draw sleeve having an interiorly tapered surface concentric with the lock plug, the draw blocks being adapted to engage the two surfaces and means for longitudinally displacing the draw tube with respect to the draw sleeve to cause movement of the draw blocks along the two opposed tapered surfaces.

5. In a self-locking chuck, an axially movable draw sleeve, radially movable chuck jaws, means interposed between the sleeve and the jaws to cause the jaws to move radially in response to axial movement of the sleeve, a lock plug concentric with and extending into the sleeve, the plug and the sleeve having opposed surfaces tapered in the same direction, the taper of the plug surface being sharper than the taper of the sleeve surface, blocks contained between and adapted to engage the opposed tapered surfaces.

6. In a self-locking chuck, an axially movable draw sleeve, radially movable chuck jaws, means interposed between the sleeve and the jaws to cause the jaws to move radially in response to axial movement of the sleeve, a lock plug concentric with and extending into the sleeve, the plug and the sleeve having opposed surfaces tapered in the same direction, the taper of the plug surface being sharper than the taper of the sleeve surface, blocks contained between and adapted to engage the opposed tapered surfaces, means for displacing the blocks axially to cause axial movement of the sleeve.

7. In a self-locking chuck, an axially movable draw sleeve, radially movable chuck jaws, means interposed between the sleeve and the jaws to cause the jaws to move radially in response to axial movement of the sleeve, a lock plug concentric with and extending into the sleeve, the plug and the sleeve having opposed surfaces tapered in the same direction, the taper of the plug surface being sharper than the taper of the sleeve surface, blocks contained between and adapted to engage the opposed tapered surfaces, means for displacing the blocks axially to cause axial movement of the sleeve, the taper of the sleeve and plug being such that the blocks remain at rest with respect to the tapered surfaces in the absence of means for propelling them.

8. In a self-locking chuck, an axially movable draw sleeve, radially movable chuck jaws, means interposed between the sleeve and the jaws to cause the jaws to move radially in response to axial movement of the sleeve, a lock plug concentric with and extending into the sleeve, the plug and the sleeve having opposed surfaces tapered in the same direction, the taper of the plug surface being sharper than the taper of the sleeve surface, blocks contained between and adapted to engage the opposed tapered surfaces, means for displacing the blocks axially to cause axial movement of the sleeve, means for displacing the blocks including a tube apertured to encircle the blocks and axially movable with respect to the sleeve.

9. In a self-locking chuck, an axially movable draw sleeve, radially movable chuck jaws, means interposed between the sleeve and the jaws to cause the jaws to move radially in response to axial movement of the sleeve, a lock plug concentric with and extending into the sleeve, the plug and the sleeve having opposed surfaces tapered in the same direction, the taper of the plug surface being sharper than the taper of the sleeve surface, blocks contained between and adapted to engage the opposed tapered surfaces, means for displacing the blocks axially to cause axial movement of the sleeve, means for displacing the blocks including a tube apertured to encircle the blocks and axially movable with respect to the sleeve, means on the tube adapted to engage the sleeve to positively displace the sleeve.

10. In a self-locking chuck, an axially movable draw sleeve, radially movable chuck jaws, means interposed between the sleeve and the jaws to cause the jaws to move radially in response to axial movement of the sleeve, a lock plug concentric with and extending into the sleeve, the plug and the sleeve having opposed surfaces tapered in the same direction, the taper of the plug surface being sharper than the taper of the sleeve surface, blocks contained between and adapted to engage the opposed tapered surfaces, means for displacing the blocks axially to cause axial movement of the sleeve, means for displacing the blocks including a tube apertured to encircle the blocks and axially movable with respect to the sleeve, means on the tube adapted to engage the sleeve to positively displace the sleeve, said positive displacement means being so positioned that movement of the tube first disengages the blocks from their wedging position between the plug and sleeve and then contacts the sleeve to displace it.

11. A self-locking chuck including in a housing a plurality of radially movable chuck jaws, an axially movable draw sleeve, bell crank levers interposed between the sleeve and the jaws pivoted in the housing whereby longitudinal movement of the sleeve causes radial movement of the jaws, a draw tube slidable in the draw sleeve, a draw stud associated with the draw tube adapted to displace it longitudinally, a lock plug fixed in the housing penetrating the draw tube, the draw sleeve having an internal taper, the lock plug having an opposed external taper in the same direction as and approximately half that of the internal taper, the draw tube being apertured, draw blocks contained within the apertures and adapted to engage the taper in the draw sleeve and the taper on the lock plug, the apertures in the draw tube being longer in a direction parallel with the axis of the tube than the width of the draw blocks in the same direction whereby the draw blocks are free to rock between the tapered surfaces.

WILLIAM A. SMITH.

REFERENCES CITED

The following references are of record in the file of this patent:

UNITED STATES PATENTS

| Number | Name | Date |
|---|---|---|
| 67,993 | Loomis | Aug. 20, 1867 |
| 461,870 | Gates | Oct. 27, 1891 |
| 548,773 | Cherry | Oct. 29, 1895 |
| 566,725 | Cherry | Aug. 25, 1896 |
| 1,906,424 | Schurr | May 2, 1933 |
| 2,335,149 | Hollander | Nov. 23, 1943 |
| 2,455,663 | Eaton | Dec. 7, 1948 |
| 2,470,720 | Proctor | May 17, 1949 |